(12) United States Patent
Smith et al.

(10) Patent No.: US 9,449,013 B2
(45) Date of Patent: Sep. 20, 2016

(54) APPLICATION TRANSPARENT DEDUPLICATION DATA

(75) Inventors: Brian Smith, San Ramon, CA (US); Tom Ramsdell, Walnut Creek, CA (US); Rob Rodriquez, San Jose, CA (US); Shweta Shintre, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 13/243,985

(22) Filed: Sep. 23, 2011

(65) Prior Publication Data

US 2013/0080405 A1    Mar. 28, 2013

(51) Int. Cl.
*G06F 7/00*      (2006.01)
*G06F 17/30*     (2006.01)
*G06Q 10/10*     (2012.01)
*H04L 12/58*     (2006.01)

(52) U.S. Cl.
CPC ... *G06F 17/30159* (2013.01); *G06F 17/30156* (2013.01); *G06Q 10/107* (2013.01); *H04L 51/08* (2013.01)

(58) Field of Classification Search
CPC .............................................. G06F 17/30156
USPC ...................................................... 707/626
See application file for complete search history.

(56) References Cited

U.S. PATENT DOCUMENTS

2010/0332401 A1*  12/2010  Prahlad et al. ............... 705/80
2011/0066628 A1*   3/2011  Jayaraman ................... 707/758
2011/0218972 A1*   9/2011  Tofano ......................... 707/692

OTHER PUBLICATIONS

"Data Compression and Deduplication", Cisco Systems, Inc., Retrieved from the Internet: http://www.digitalpreservation.gov/meetings/documents/othermeetings/Rao.pdf, 2010, 12 pgs.
"The Business Value of Data Deduplication DDSR SIG", SNIA Data Management Forum, Retrieved from the Internet: http://www.snia.org/sites/default/files/Dedupe_Business_Value_V5.pdf Accessed on Jun. 18, 2013, 19 pgs.
Whitehouse, Lauren , "HP StoreOnce Deduplication Software", White Paper, Enterprise Strategy Group, Inc., Retrieved from the Internet: http://h18006.www1.hp.com/storage/pdfs/hpstoreonce.pdf, 2010, 11 pgs.

* cited by examiner

*Primary Examiner* — Ajith Jacob
(74) *Attorney, Agent, or Firm* — Kwan & Olynick LLP

(57) ABSTRACT

Mechanisms are provided to allow for application transparent deduplication data. A mail database associated with a mail application can be analyzed to identify attachments meeting particular administrator criteria. The attachments are analyzed and replaced with stubs to allow continued mail application interaction with the mail database. The attachments may be optimized with deduplication and/or compression.

20 Claims, 7 Drawing Sheets

| Object Map File X 101 | | |
|---|---|---|
| Offset 103 | Index 105 | Lname 107 |
| 0K | 0.1 | NULL |
| 8K | 0.2 | NULL |
| 16K | 0.3 | NULL |

Figure 1

| Datastore Suitcase 271 | | |
|---|---|---|
| | Data Table 251 | |
| Index 253 | Data Offset 255 | Data Reference Count 257 |
| 1 | Offset-Data Chunk A | 1 |
| 2 | Offset-Data Chunk B | 1 |
| 3 | Offset-Data Chunk C | 1 |
| | Datastore | |
| | Data 261 | Last File 263 |
| 1 | Data Chunk A | File X 201 |
| 2 | Data Chunk B | File X 201 |
| 3 | Data Chunk C | File X 201 |

Figure 2

| Dictionary 301 ||
|---|---|
| Fingerprint 311 | Storage Location 321 |
| a | Location 323 |
| b | Location 325 |
| c | Location 327 |

| Dictionary 351 ||
|---|---|
| Fingerprint 361 | Storage Location 371 |
| i | Location 373 |
| j | Location 375 |
| k | Location 377 |

Figure 3

APPLICATION TRANSPARENT DEDUPLICATION DATA

TECHNICAL FIELD

The present disclosure relates to maintaining application transparent deduplication data.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across objects such as files to increase storage, transmission, and/or processing efficiency. A storage system which incorporates deduplication technology involves storing a single instance of a data chunk that is common across multiple objects. Objects such as files are processed to identify data chunks that can be deduplicated. Object handles such as file handles are replaced with file stubs, so that clients can continue to access deduplicated objects as though the objects were not deduplicated. Actual data chunks may be maintained in datastore suitcases accessible using a deduplication dictionary.

However, mechanisms for maintaining application transparent deduplication data are limited. Consequently, mechanisms are provided to allow for application transparent deduplication data.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of an object map.

FIG. 2 illustrates a particular example of a datastore suitcase.

FIG. 3 illustrates a particular example of a dictionary.

DESCRIPTION OF PARTICULAR EMBODIMENTS

Figure 4:
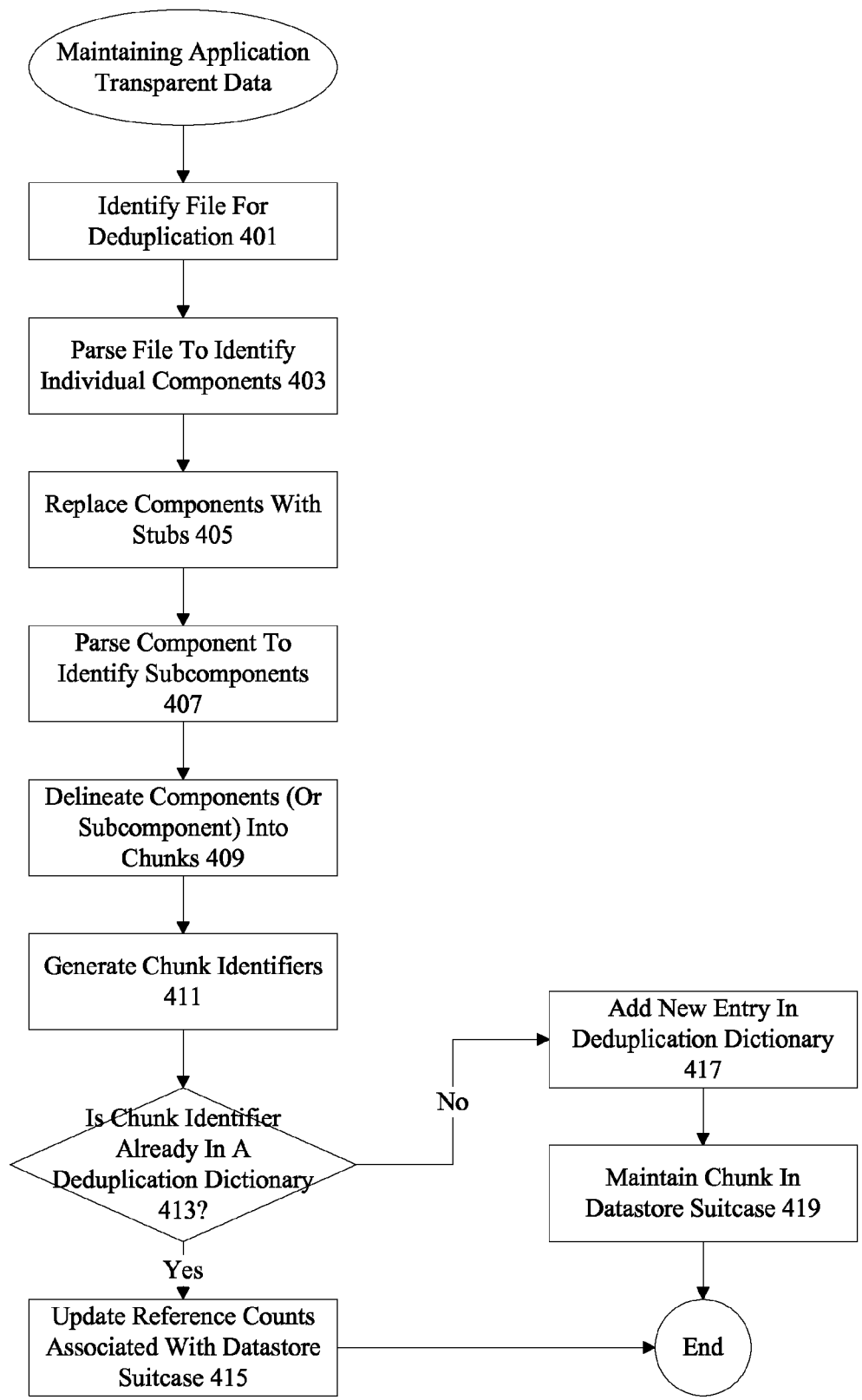
FIG. 4 illustrates a particular example of a technique for maintaining application transparent deduplication data.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular deduplication system nodes and network interfaces. However, it should be noted that the techniques and mechanisms of the present invention apply to a variety of different deduplication system nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to allow for application transparent deduplication data. A mail database associated with a mail application can be analyzed to identify attachments meeting particular administrator criteria. The attachments are analyzed and replaced with stubs to allow continued mail application interaction with the mail database. The attachments may be optimized with deduplication and/or compression.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data.

Deduplication may involve identifying variable or fixed sized chunks. According to various embodiments, each chunk of data may be fingerprinted using a hash algorithm such as MD5 or SHA-1. This process generates an identifier for each chunk. If a file is updated, only the changed data may be saved. That is, if only a few bytes of a document or presentation are changed, only changed portions are saved. In some instances, deduplication searches for matching sequences using a fixed or sliding window and uses references to matching sequences instead of storing the matching sequences again.

According to various embodiments, deduplication systems include dictionaries, object maps, and datastore suitcases. A dictionary is a file that contains the chunk identifiers and location pairs. The chunk identifiers can be created by using a checksum or a hashing mechanism like MD5 or SHA. Since the dictionary can grow into a large file (>1 TB) it must be organized in a way that makes it readily searchable. Organizing the identifier/location pairs in a binary tree is one approach that can be used to accelerate searches. Each deduplication system node in a network can have its own dictionary.

In particular embodiments, object maps are regular files which hold index mappings for deduplicated files. Object maps are used to reference all data chunks for the associated object or file whether the chunks are common to other files or unique. A datastore suitcase holds the actual data chunks for the deduplicated files. Each data chunk has a reference count associated with it. The reference count specifies the number of object map entries which are referencing the data chunk. When the reference count is zero, a cleaner application can delete the entry from the suitcase. It should be noted that the metadata is grouped together before the data chunks. The datastore suitcase includes a header having a unique datastore identifier as well as metadata length and offset information. The datastore identifier may be used to find associated datastore suitcases. The header also includes the location of the next available offset for additional metadata entries.

With the dictionary, file or object maps, and datastore suitcases, a file system independent layout for storing and referencing deduplicated data can be implemented.

In many implementations, files are analyzed and delineated to identify chunks for deduplication. The term files as used herein includes objects, volumes, databases, and other data sets. Files may be virtual machines, mail databases, image stores, etc. Files are analyzed to perform deduplication. Certain chunks in a particular file may already be stored while others may need to be stored for the first time. A deduplication system uses deduplication dictionaries, file maps, and datastore suitcases to maintain deduplicated chunks and to allow access to deduplicated chunks when the data is accessed. The files themselves are replaced with file stubs and users and applications access the deduplicated data using these file stubs.

However, in many instances, applications may want to perform operations on the files themselves. For example, applications may want to reorganize or perform a backup on a file. Reorganizing, performing a backup, or otherwise performing processing on a stub may not have an application intended effect or may even lead to deleterious effects. Consequently, techniques of the present invention continue to provide the actual file itself to an application. According to various embodiments, the file is parsed to identify file components for optimization, including compression and/or deduplication. The files components themselves may also be files or various data segments. According to various embodiments, components are delineated into chunks for deduplication. Chunk identifiers are generated in order to access a deduplication dictionary. If a chunk identifier for a particular chunk is already in the deduplication dictionary, the chunk is already stored in a deduplication system and does not need to be stored again. Space and resources can be saved by merely updating a reference count associated with a datastore suitcase. In particular embodiments, the file is a mail database associated with a mail server. In other embodiments, the file is a virtual disk file associated with a virtual machine.

According to various embodiments, an administrator can configure a policy to implement deduplication on attachments in a file such as a mail server database. In particular embodiments, the policy may be to perform optimization on all mail attachments exceeding a particular size. An application program interface associated with the mail server database can be accessed to replace attachments with stubs. A mail application can continue to access the attachments using the stubs without adversely affecting application operation. The attachments themselves may be files themselves that are then delineated to identify chunks appropriate for deduplication. Deduplication dictionaries and datastore suitcases may be updated to maintain chunks from attachments.

Component stubs are transparent to end users. Files and file components appear exactly the same as non-optimized files and file components. Instead of using client side plug-ins and a single stub for an entire large application file, the application file remains but components of the application file are replaced with individual stubs. According to various embodiments, a goal is to make stubbing transparent to end users. Data is re-hydrated when it is returned to the client.

FIG. 1 a particular example of a mechanism for managing data chunks. It should be noted that although a particular mechanism is described, a wide variety of mechanisms can be used. According to various embodiments, object map file X 101 includes offset 103, index 105, and lname 107 fields. In particular embodiments, each chunk in the object map for file X is 8K in size. In particular embodiments, each data chunk has an index of format <Datastore Suitcase ID>.<Data Table Index>. For example, 0.1 corresponds to suitcase ID 0 and datatable index 1, while 2.3 corresponds to suitcase ID 2 and database index 3. The chunks corresponding to offsets 0K, 8K, and 16K all reside in suitcase ID 0 while the data table indices are 1, 2, and 3. The lname field 107 is NULL in the object map because each chunk has not previously been referenced by any file.

FIG. 2 illustrates one example of a datastore suitcase corresponding to the object map file X 101. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset reference count pairs which map to the data chunks of the object map file X 101. In the index portion, index 1 corresponding to data in offset-data chunk A has been referenced once. Index 2 corresponding to data in offset-data chunk B has been referenced once. Index 3 corresponding to data in offset-data chunk C has been referenced once. In the data portion, index 1 includes data chunk A and a reference to File X 101 which was last to place a reference on the data chunk A. Index 2 includes data chunk B and a reference to File X 101 which was last to place a reference on the data chunk B. Index 3 includes data chunk C and a reference to File X 101 which was last to place a reference on the data chunk C.

FIG. 3 illustrates multiple dictionaries assigned to different fingerprints. According to various embodiments, the fingerprints values are checksums, SHA/SHA1/SHA-256 hash values. In particular embodiments, dictionary 301 is a deduplication dictionary used by a first node and includes fingerprint ranges from 0x0000 0000 0000 0000-0x0000 0000 FFFF FFFF. Dictionary 351 is used by a second node and includes fingerprint ranges from 0x0000 0001 0000 0000-0X0000 0001 FFFF FFFF. Fingerprints 311 within the range for dictionary 301 are represented by symbols a, b, and c for simplicity. Fingerprints 361 within the range for dictionary 351 are represented by symbols i, j, and k for simplicity. According to various embodiments, each fingerprint in dictionary 301 is mapped to a particular storage location 321 such as location 323, 325, or 327. Each fingerprint in dictionary 351 is mapped to a particular storage location 371 such as location 373, 375, and 377.

Having numerous small chunks increases the likelihood that duplicates will be found. However, having numerous small chunks decreases the efficiency of using the dictionary itself as well as the efficiency of using associated object maps and datastore suitcases.

FIG. 4 illustrates a particular example of deduplicating data in native file formats. According to various embodiments, a file is identified for deduplication at 401. In particular embodiments, the file may be identified for optimization including deduplication and compression. The file may be a mail database, application file, virtual machine disk volume, or any other file that includes multiple components that may be individually deduplicated. According to various embodiments, the file is parsed to identify individual components at 403. In particular embodiments, the individual components are replaced with stubs at 405. The individual components may be mail attachments, virtual machine files, images, documents, executables, etc. In some instances, the components themselves are further parsed to identify subcomponents at 407. In particular embodiments, the subcomponents need not be replaced by stubs but are merely used to apply more intelligent boundary determination mechanisms for deduplication and more intelligent file specific algorithms for compression. For example, a document may include multiple images and a video clip, each of which can be individually deduplicated.

According to various embodiments, a component (or subcomponent) is delineated into multiple chunks at 409. In a particular example, a mail database is a file that is parsed to identify multiple mail attachment components of the file. A mail attachment component may be a container file that includes multiple image files and text files that may be identified as subcomponents. These subcomponents may be further delineated into chunks. In some examples, an entire image file may be treated as a single chunk. Chunks may have fixed sizes and fixed boundary locations. In other examples, chunks may have fixed sizes but variable boundary locations that may in fact cause chunks to overlaps. In still other examples, chunks may have variable sizes and variable boundary locations.

Chunk boundaries may also be determined using a windowing algorithm. According to various embodiments, chunk boundaries are selected to increase the probability the individual chunks will have matches in a deduplication dictionary. At 411, chunk identifiers are generated. Chunk identifiers may be hashes of chunks used to reference a chunk in a deduplication dictionary. According to various embodiments, if a chunk is already in a deduplication dictionary at 413, the chunk is already stored and reference counts associated with a datastore suitcase can be updated at 415. If a chunk is not already in a deduplication dictionary at 413, a new entry is added to the deduplication dictionary at 417 and the chunk is maintained in a datastore suitcase at 419.

Figure 5:
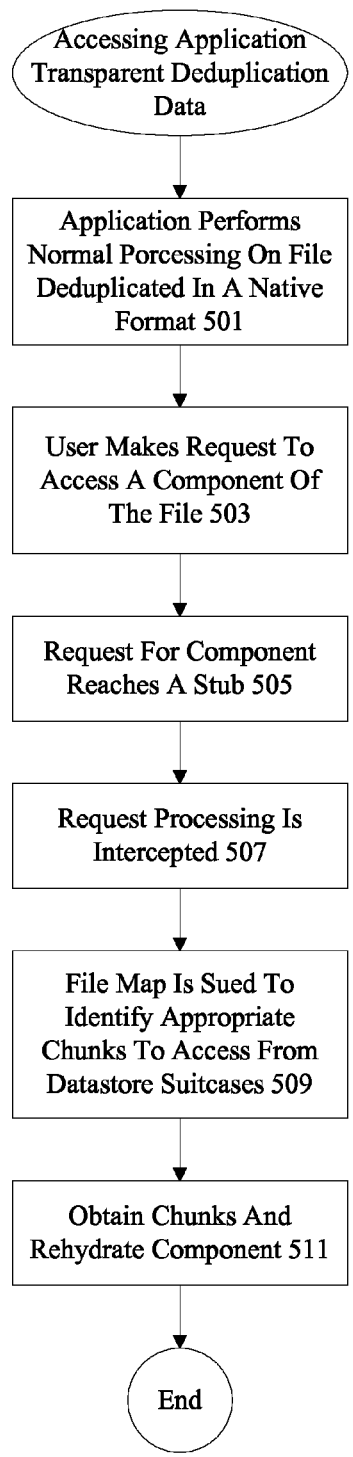
FIG. 5 illustrates a particular example of a technique for accessing application transparent deduplication data.

FIG. 5 illustrates a particular example of a technique for accessing a component of a file duplicated in a native format. According to various embodiments, an application performs normal processing on a file deduplicated in a native format at 501. For example, an application may perform conventional file maintenance and file processing operations, such as file copying. The file need not be replaced with a stub. At 503, a user makes a request to access a component of the file. According to various embodiments, various application program interfaces may be used to access the component. In particular embodiments, the request for the component reaches a stub at 505.

According to various embodiments, request processing is intercepted at 507 and the component is reflated or rehydrated from deduplicated chunks. In some examples, a file map may be used to identify appropriate chunks to access from datastore suitcases at 509. Chunks from datastore suitcases are obtained and rebuilt into a component being requested by a user or other entity at 511.

Figure 6:
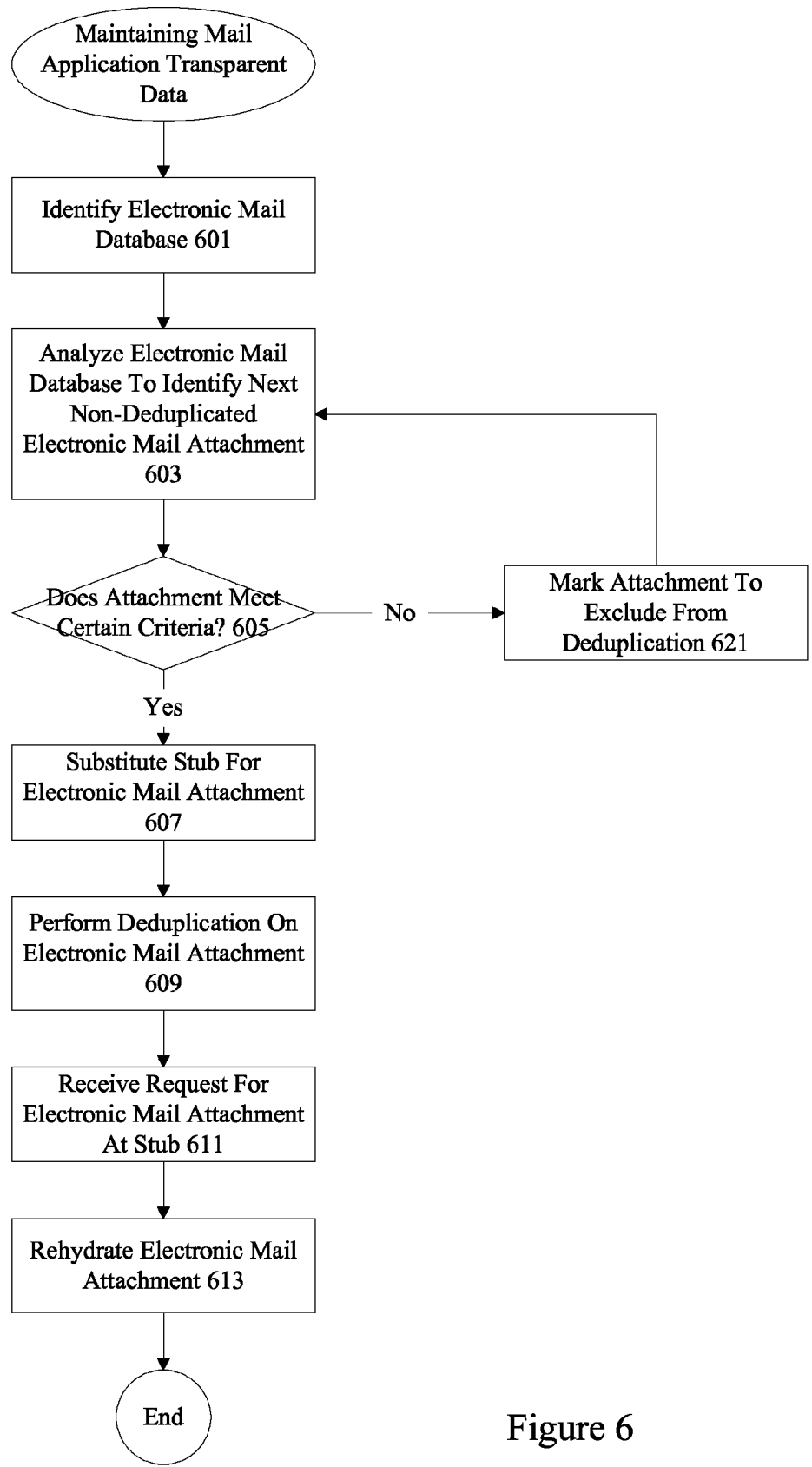
FIG. 6 illustrates a particular example of a technique for processing mail application deduplication data.

FIG. 6 illustrates one example of a technique for processing an electronic mail database. At 601, an electronic mail database is identified. According to various embodiments, an electronic mail database is continuously analyzed to identify electronic mail attachments that have not yet been deduplicated at 603. If the electronic mail attachment meets a certain criteria at 605, a stub is substituted for the electronic mail attachment at 607. The criteria may be an attachment size, type, or some other identified characteristics. If the criteria is not met, the attachment is excluded from deduplication at 621. In particular embodiments, administrators can set criteria for attachments for deduplication. In other examples, criteria may default to all deduplication or minimal deduplication. At 609, an electronic mail attachment is deduplicated. According to various embodiments, deduplicating an electronic mail attachment may involve delineating the electronic mail attachment into chunks or may involve separating the electronic mail attachment into subfiles before delineating each subfile into chunks.

At 611, a request for an electronic mail attachment is received at a stub. An electronic mail application can continue to perform normal processing on an electronic mail database as though no deduplication has occurred. At 613, an electronic mail attachment is rehydrated upon receiving the request at the stub.

Figure 7:
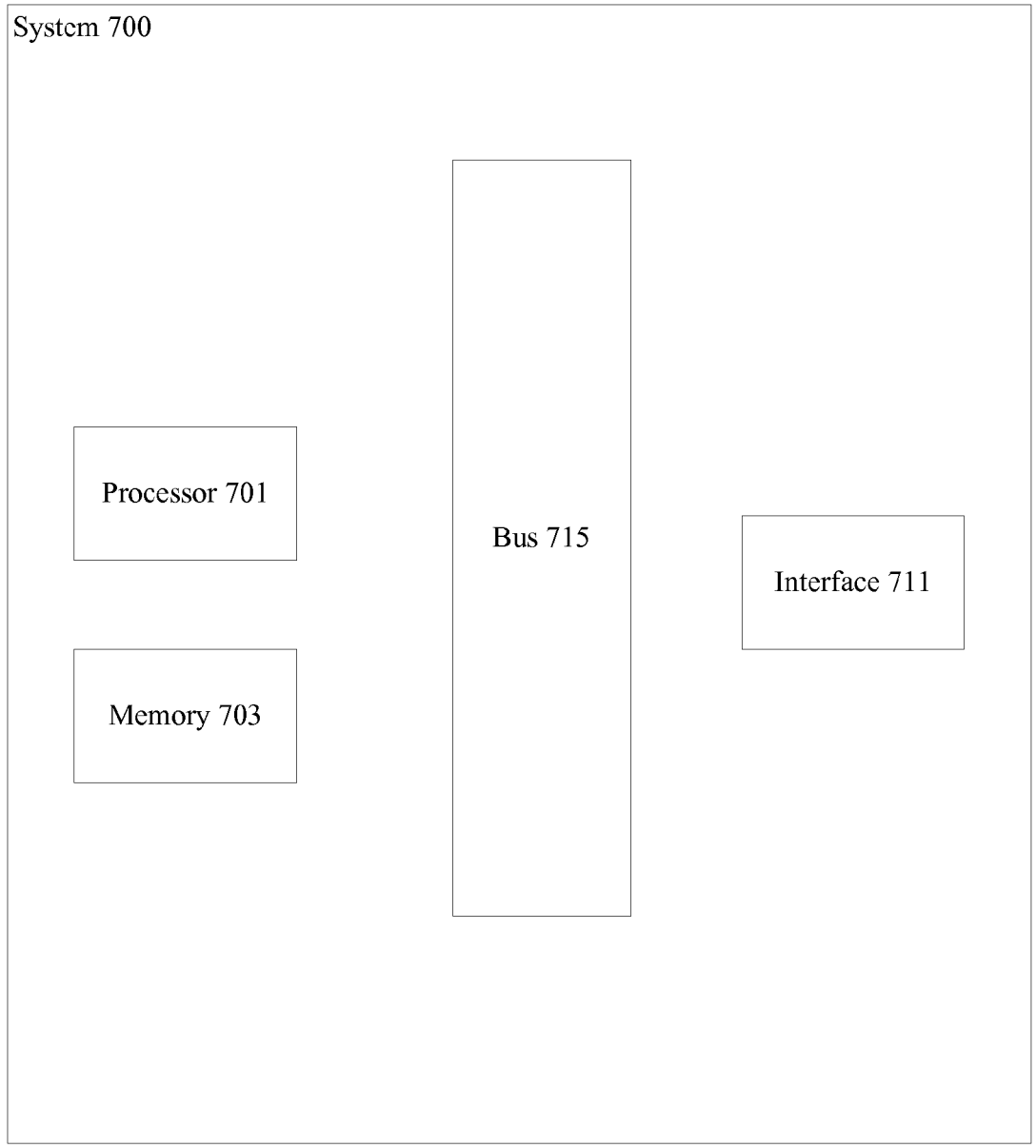
FIG. 7 illustrates a particular example of a computer system.

A variety of devices and applications can implement particular examples of the present invention. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data chunks over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    analyzing an electronic mail database to identify a plurality of electronic mail attachments included in the electronic mail database, the plurality of electronic mail attachments including a first electronic mail attachment and a second electronic mail attachment;
    substituting a first stub for a first electronic mail attachment and a second stub for the second electronic mail attachment;
    deduplicating, using a datastore suitcase and a dictionary, the first electronic mail attachment and the second electronic mail attachment, wherein the first stub and the second stub allow an electronic mail application to both access and perform operations on the first electronic mail attachment and the second electronic mail attachment as though the first electronic mail attachment and the second electronic mail attachment are not deduplicated;
    wherein the first electronic mail attachment is rehydrated upon receiving a request from the electronic mail application for the first electronic mail attachment, wherein the request is received at the first stub.

2. The method of claim 1, wherein deduplicating the first electronic mail attachment comprises delineating the first electronic mail attachment into a first plurality of chunks.

3. The method of claim 1, wherein deduplicating the first electronic mail attachment comprises generating a first chunk identifier corresponding to a first chunk, the first chunk identifier used to access a deduplication dictionary.

4. The method of claim 1, wherein deduplicating the first electronic mail attachment comprises determining whether the first chunk is already stored in a deduplication system using the first chunk identifier and the deduplication dictionary.

5. The method of claim 1, wherein the first electronic mail attachment is further separated into a first plurality of subcomponents.

6. The method of claim 1, wherein the electronic mail database is maintained by the electronic mail application in an application native file format.

7. The method of claim 6, wherein the first stub is accessed by the application without adversely affecting application operation.

8. The method of claim 1, wherein the first chunk identifier is a hash of the first chunk.

9. The method of claim 1, wherein the deduplication dictionary maintains a plurality of chunk identifiers and corresponding chunk locations.

10. The method of claim 1, wherein the first chunk is maintained in a datastore suitcase.

11. The method of claim 1, wherein the first stub is substituted for the first electronic mail attachment if the first electronic mail attachment exceeds a predetermined size.

12. A server, comprising:
    a processor configured to analyze an electronic mail database to identify a plurality of electronic mail attachments included in the electronic mail database, the plurality of electronic mail attachments including a first electronic mail attachment and a second electronic mail attachment, wherein a first stub is substituted for a first electronic mail attachment and a second stub is substituted for the second electronic mail attachment;
    deduplication logic configured to deduplicate, using a datastore suitcase and a dictionary, the first electronic mail attachment and the second electronic mail attachment, wherein the first stub and the second stub allow an electronic mail application to both access and perform operations on the first electronic mail attachment and the second electronic mail attachment as though the first electronic mail attachment and the second electronic mail attachment are not deduplicated;
    wherein the first electronic mail attachment is rehydrated upon receiving a request from the electronic mail application for the first electronic mail attachment, wherein the request is received at the first stub.

13. The server of claim 12, wherein deduplicating the first electronic mail attachment comprises delineating the first electronic mail attachment into a first plurality of chunks.

14. The server of claim 12, wherein deduplicating the first electronic mail attachment comprises generating a first chunk identifier corresponding to a first chunk, the first chunk identifier used to access a deduplication dictionary.

15. The server of claim 12, wherein deduplicating the first electronic mail attachment comprises determining whether the first chunk is already stored in a deduplication system using the first chunk identifier and the deduplication dictionary.

16. The server of claim 12, wherein the first electronic mail attachment is further separated into a first plurality of subcomponents.

17. The server of claim 12, wherein the electronic mail database is maintained by the electronic mail application in an application native file format.

18. The server of claim 17, wherein the first stub is accessed by the application without adversely affecting application operation.

19. The server of claim 12, wherein the first chunk identifier is a hash of the first chunk.

20. A non-transitory computer readable medium having computer code embodied therein, the computer readable medium comprising:

computer code for analyzing an electronic mail database to identify a plurality of electronic mail attachments included in the electronic mail database, the plurality of electronic mail attachments including a first electronic mail attachment and a second electronic mail attachment;

computer code for substituting a first stub for a first electronic mail attachment and a second stub for the second electronic mail attachment;

computer code for deduplicating, using a datastore suitcase and a dictionary, the first electronic mail attachment and the second electronic mail attachment, wherein the first stub and the second stub allow an electronic mail application to both access and perform operations on the first electronic mail attachment and the second electronic mail attachment as though the first electronic mail attachment and the second electronic mail attachment are not deduplicated;

wherein the first electronic mail attachment is rehydrated upon receiving a request from the electronic mail application for the first electronic mail attachment, wherein the request is received at the first stub.

\* \* \* \* \*